(12) United States Patent
Matsukawa et al.

(10) Patent No.: US 9,137,499 B2
(45) Date of Patent: Sep. 15, 2015

(54) APPARATUS FOR DETECTING OBJECT APPROACHING VEHICLE

(75) Inventors: Norifumi Matsukawa, Nagoya (JP);
Muneaki Matsumoto, Okazaki (JP);
Nobuyuki Yokota, Kariya (JP)

(73) Assignee: DENSO CORPORATION, Kariya (JP)

( * ) Notice: Subject to any disclaimer, the term of this patent is extended or adjusted under 35 U.S.C. 154(b) by 440 days.

(21) Appl. No.: 13/539,812

(22) Filed: Jul. 2, 2012

(65) Prior Publication Data

US 2013/0010114 A1    Jan. 10, 2013

(30) Foreign Application Priority Data

Jul. 4, 2011    (JP) .................. 2011-148272

(51) Int. Cl.
*H04N 7/18* (2006.01)
*B60R 1/00* (2006.01)
*G06K 9/20* (2006.01)
*G06K 9/00* (2006.01)

(52) U.S. Cl.
CPC .. *H04N 7/18* (2013.01); *B60R 1/00* (2013.01); *G06K 9/00798* (2013.01); *G06K 9/00805* (2013.01); *G06K 9/2054* (2013.01); *G06K 9/2081* (2013.01); *B60R 2300/302* (2013.01); *B60R 2300/605* (2013.01); *B60R 2300/70* (2013.01); *B60R 2300/804* (2013.01); *B60R 2300/806* (2013.01)

(58) Field of Classification Search
CPC .......... G01S 11/12; B63B 45/02; B63B 49/00
USPC ......................................... 348/148, 113–117
See application file for complete search history.

(56) References Cited

U.S. PATENT DOCUMENTS

| | | | | |
|---|---|---|---|---|
| 2010/0271237 | A1* | 10/2010 | Reed et al. | 340/932.2 |
| 2010/0271238 | A1* | 10/2010 | Reed et al. | 340/932.2 |
| 2011/0037853 | A1* | 2/2011 | Shiraishi | 348/148 |
| 2011/0228980 | A1 | 9/2011 | Ichikawa et al. | |
| 2014/0044311 | A1* | 2/2014 | Takahashi | 382/103 |

FOREIGN PATENT DOCUMENTS

| | | |
|---|---|---|
| JP | 09-142209 | 6/1997 |
| JP | 11321495 A * | 11/1999 |
| JP | 2001-239832 | 9/2001 |
| JP | 2002-369186 | 12/2002 |
| JP | 2005-247067 | 9/2005 |
| WO | WO 2011/043006 | 4/2011 |

OTHER PUBLICATIONS

Office action dated Apr. 15, 2014 in corresponding Japanese Application No. 2011-148272.

* cited by examiner

*Primary Examiner* — Andy Rao
(74) *Attorney, Agent, or Firm* — Harness, Dickey & Pierce, PLC (57) ABSTRACT

An apparatus for detecting an object approaching a vehicle by performing image recognition processing on an image captured by a camera that is mounted on the vehicle to cover a predetermined area around the vehicle includes a signal receiver, a selector, and a detector. The signal receiver obtains a vehicle signal indicative of an operating condition of the vehicle. The selector selects a predetermined region of the captured image, according to the vehicle signal, as an object detection region. The detector detects the object approaching the vehicle by performing the image recognition processing on only the object detection region of the captured image.

6 Claims, 5 Drawing Sheets

APPARATUS FOR DETECTING OBJECT APPROACHING VEHICLE

CROSS REFERENCE TO RELATED APPLICATION

This application is based on Japanese Patent Application No. 2011-148272 filed on Jul. 4, 2011, the disclosure of which is incorporated herein by reference.

TECHNICAL FIELD

The present disclosure relates to an apparatus for detecting an object approaching a vehicle.

BACKGROUND

In a technique disclosed in JP-2001-239832A, an object approaching a vehicle is detected by performing image recognition processing on an image captured by a camera that is mounted on the vehicle to capture the area around the vehicle.

In the technique, the image recognition processing is applied on the entire region of the captured image. Therefore, high processing load is required when the image recognition processing is performed.

SUMMARY

In view of the above, it is an object of the present disclosure to provide a technique for reducing processing load required to perform image recognition processing to detect an object approaching a vehicle.

According to an aspect of the present disclosure, an apparatus for detecting an object approaching a vehicle by performing image recognition processing on an image captured by a camera that is mounted on the vehicle to cover a predetermined area around the vehicle includes a signal receiver, a selector, and a detector. The signal receiver obtains a vehicle signal indicative of an operating condition of the vehicle. The selector selects a predetermined region of the captured image, according to the vehicle signal, as an object detection region. The detector detects the object approaching the vehicle by performing the image recognition processing on only the object detection region of the captured image.

According to another aspect of the present disclosure, an apparatus for detecting an object approaching a vehicle by performing image recognition processing on an image captured by a camera that is mounted on the vehicle to cover a predetermined area around the vehicle includes a calculator, a selector, and a detector. The calculator calculates an inclination angle of a road around the vehicle with respect to the vehicle. The selector selects a predetermined region of the captured image, according to the inclination angle, as an object detection region. The detector detects the object approaching the vehicle by performing the image recognition processing on only the object detection region of the captured image. The object detection region corresponds to an area extending along the inclination angle of the road.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
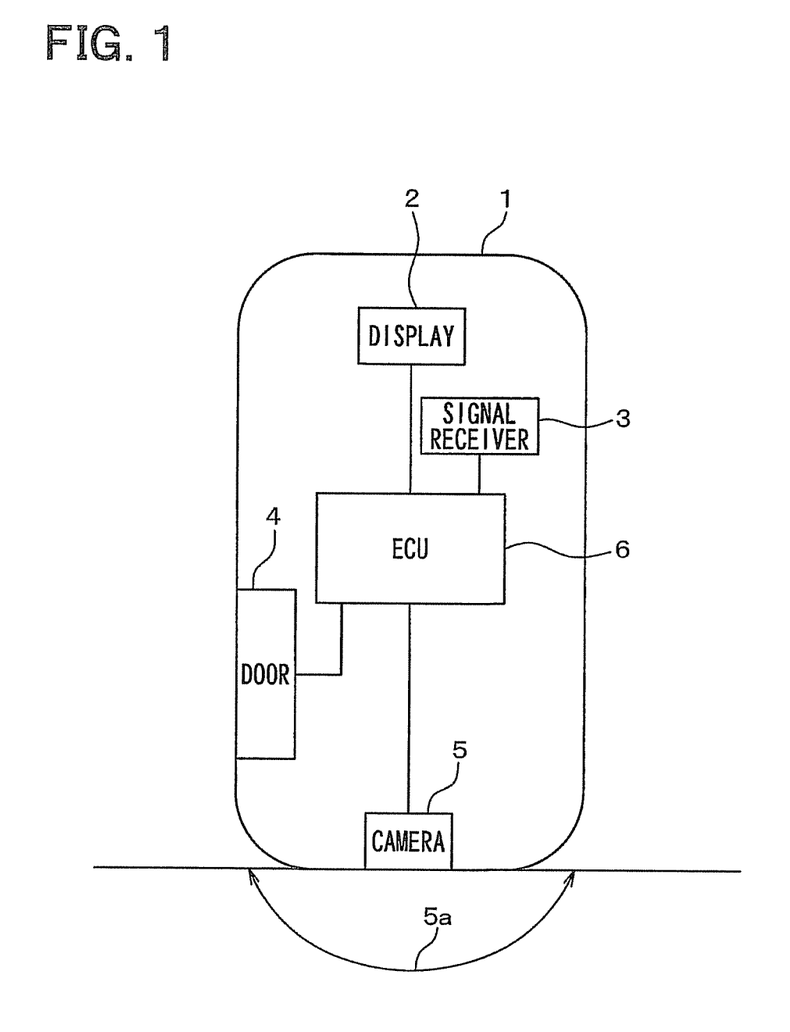
FIG. 1 is a block diagram of a vehicle system according to a first embodiment of the present disclosure.

A vehicle system according to a first embodiment of the present invention is described below with reference to FIG. 1. The vehicle system is mounted on a vehicle 1 and includes a display apparatus 2, a vehicle signal receiver 3, an electric sliding door 4, an on-board camera 5, and an electronic control unit (ECU) 6.

The display apparatus 2 displays an image to an occupant of the vehicle 1 according to control of the ECU 6. For example, an image captured by the on-board camera 5 can be displayed on the display apparatus 2. The vehicle signal receiver 3 obtains a vehicle signal indicative of an operating condition of the vehicle 1. Examples of the vehicle signal can include a shift position signal indicative of a shift position of the vehicle 1, a speed signal indicative of a speed of the vehicle 1, and a blinker signal indicative of operation conditions of left and right blinkers of the vehicle 1. The electric sliding door 4 is a left backseat door of the vehicle 1 and opened and closed according to control of the ECU 6.

The on-board camera 5 is a wide-angle camera and mounted in the back of the vehicle 1 to capture an image of the area behind the vehicle 1. As shown in FIG. 1, the on-board camera 5 covers a capture area 5a within an angle of 180 degrees with respect to the back of the vehicle 1. The image captured by the on-board camera 5 is inputted to the ECU 6 at regular intervals (e.g., sixty times per second) in frame.

The ECU 6 is a microcontroller having a CPU, RAM, and ROM. The CPU executes programs stored in the ROM by using the RAM as a working space so that the ECU 6 can perform various processes.

Figure 2:
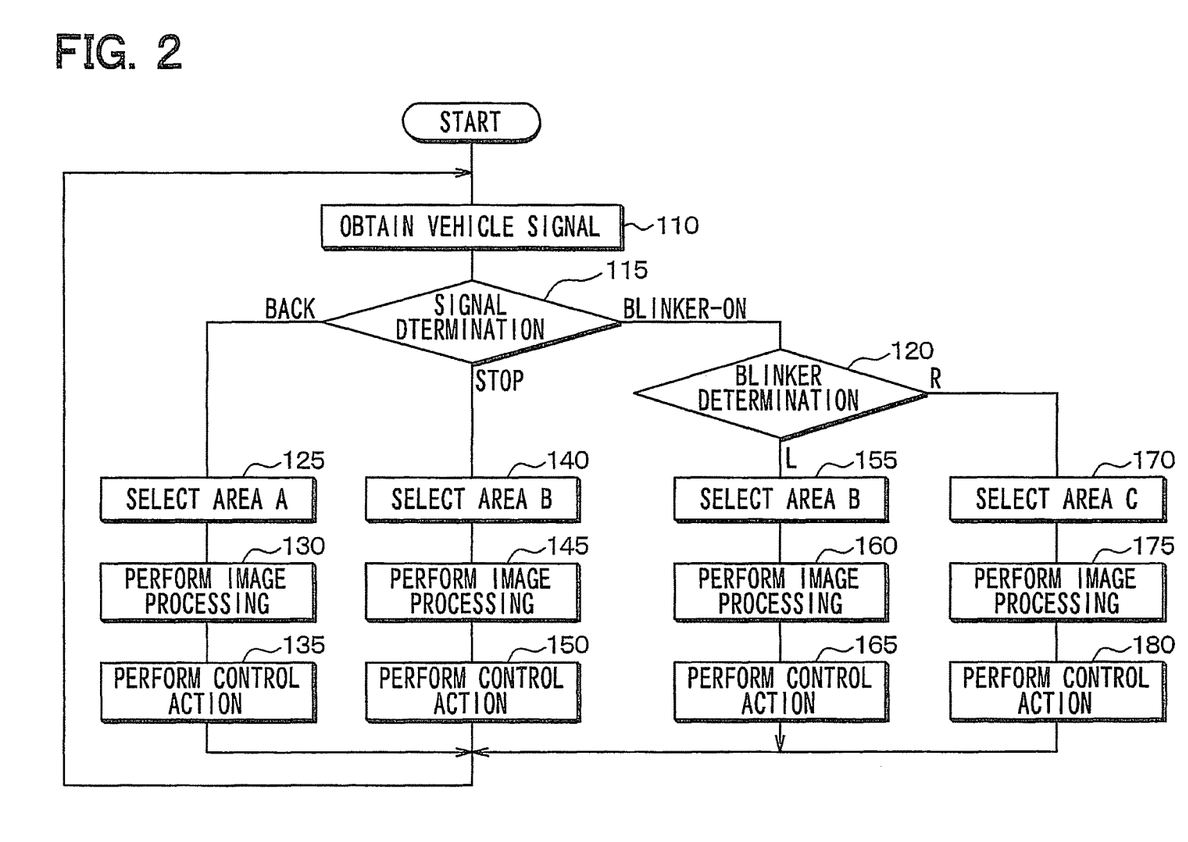
FIG. 2 is a flow diagram illustrating a control process performed by an electronic control unit of the vehicle system.

An operation of the vehicle system is described below with reference to FIG. 2. FIG. 2 is a flow chart of a control process performed by the ECU 6, for example, when a main power (e.g., ignition switch) of the vehicle 1 is turned ON. The control process starts at step 110, where the ECU 6 obtains the vehicle signal from the vehicle signal receiver 3. Then, the control process proceeds to step 115, where the ECU 6 determines a type of the vehicle signal. If the vehicle signal is the shift position signal indicating that the shift position of the vehicle 1 is in a reverse position corresponding to "REVERSE" at step 115, the control process proceeds to step 125. If the vehicle signal is the speed signal indicating that the speed of the vehicle 1 is zero (or a lower than a predetermined minimum speed) corresponding to "STOP" at step 115, the control process proceeds to step 140.

If the vehicle signal is the blinker signal indicating that the left or right blinker of the vehicle 1 is ON (i.e., blinking) corresponding to "BLINKER-ON" at step 115, the control process proceeds to step 120. At step 120, the ECU 6 determines which blinker is blinking. If the left blinker is blinking corresponding to "L" at step 120, the control process proceeds to step 155. In contrast, if the right blinker is blinking corresponding to "R" at step 120, the control process proceeds to step 170.

At step 125, which is performed when the vehicle 1 moves back, the ECU 6 selects a first region of the image captured by the on-board camera 5 as an object detection region. The first region corresponds to a first area A of the capture area 5a.

Figure 3:
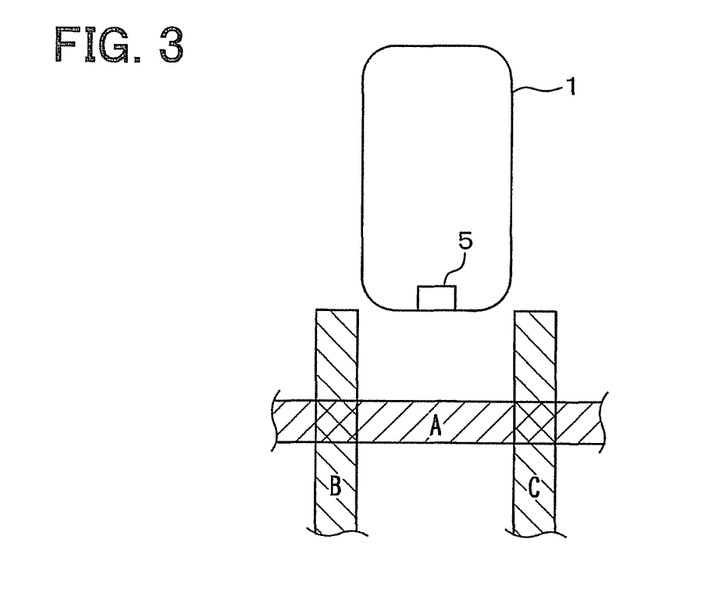
FIG. 3 is a diagram illustrating an area around a vehicle corresponding to an object detection region of an image captured by an on-board camera of the vehicle system.
Figure 4:
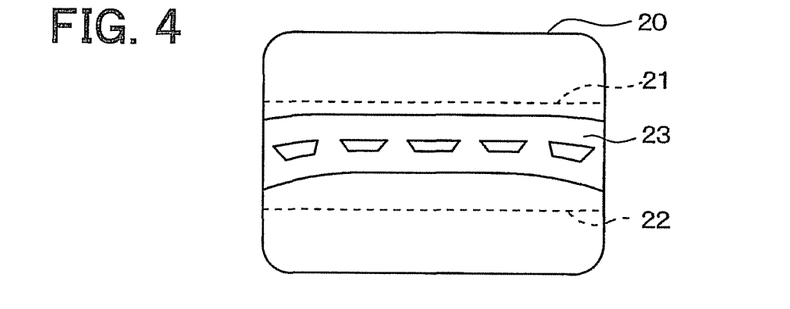
FIG. 4 is a diagram illustrating the object detection region of the captured image.

As shown in FIG. 3, the first area A is a band-like area having a predetermined width in a vertical direction of the vehicle 1. The first area A is located at a predetermined distance from the back end of the vehicle 1 in a longitudinal direction of the vehicle 1 and extends from infinity to infinity in a lateral direction of the vehicle 1. FIG. 4 is a diagram illustrating one frame of an image 20 captured by the on-board camera 5. In the captured image 20 shown in FIG. 4, the first region corresponding to the first area A is a region between a broken line 21 and a broken line 22. That is, the first region corresponding to the first area A has neither a lower region (below the broken line 22 in FIG. 4) of the captured image 20 corresponding to an area near to the back end of the vehicle 1 and an upper region (above the broken line 21 in FIG. 4) of the captured image 20 corresponding to an area far from the back end of the vehicle 1.

Then, the control process proceeds from step 125 to step 130, where the ECU 6 performs image recognition processing on only the first region of each of multiple frames of the captured image 20 to detect an object approaching the vehicle 1. In this case, a conventional detection method can be used to detect the object approaching the vehicle 1 based on the first region of the captured image 20. For example, the ECU 6 can perform motion detection processing on the first region of the captured image 20 to detect whether an object moving in a direction approaching the vehicle 1 exists or not.

Then, the control process proceeds from step 130 to step 135, where the ECU 6 performs a predetermined control action depending on the result of the image recognition processing performed at step 130. For example, if an object approaching the vehicle 1 is detected at step 130, the ECU 6 can cause an audio output device (not shown), such as a speaker, to output an audible alarm at step 135 that warns an occupant of the vehicle 1 that there is an object approaching the vehicle 1. Further, at step 135, the ECU 6 can display the captured image 20 on the display apparatus 2. In this case, the approaching object can be highlighted in the captured image 20. Furthermore, at step 135, the ECU 6 can intervene and control, for example, an engine and/or a brake actuator of the vehicle 1 to limit movement of the vehicle 1.

When the vehicle 1 moves back (in particular, when the vehicle 1 backs out of a parking lot), a road 23 is located slightly far from the back end of the vehicle 1 in the longitudinal direction of the vehicle 1. In this case, there is a relatively high risk that the vehicle 1 collides with a vehicle running on the road 23. According to the first embodiment, the first area A can cover the road 23. Therefore, a vehicle running on the road 23 and approaching the vehicle 1 can be surely detected by performing the image recognition processing on only the first region of the captured image 20 corresponding to the first area A.

In contrast, if an object approaching the vehicle 1 is not detected at step 130, the ECU 6 displays the captured image 20 on the display apparatus 2 at step 135 without performing any other of the above control actions. After step 135, the control process returns to step 110.

At step 140, which is performed when the vehicle 1 is stopped, the ECU 6 selects a second region of the image captured by the on-board camera 5 as an object detection region. The second region corresponds to a second area B of the capture area 5a.

Figure 5:
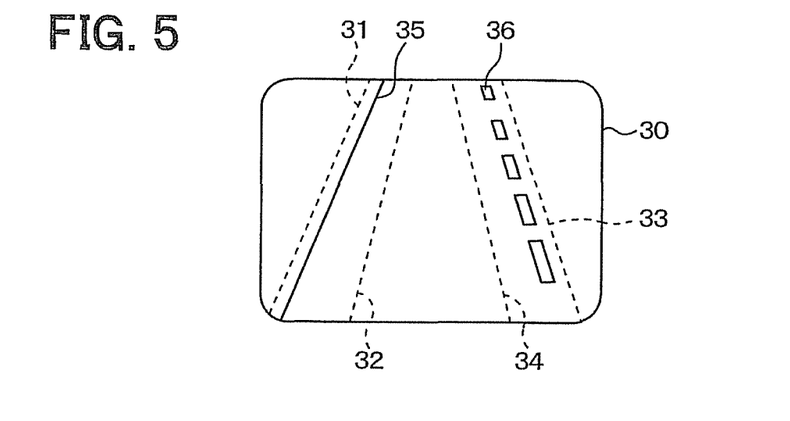
FIG. 5 is a diagram illustrating the object detection region of another captured image.

As shown in FIG. 3, the second area B is a band-like area having a predetermined width in the lateral direction of the vehicle 1. The second area B extends backward from the back end of the vehicle 1 to infinity in the longitudinal direction of the vehicle 1. FIG. 5 is a diagram illustrating one frame of an image 30 captured by the on-board camera 5. In the captured image 30 shown in FIG. 5, the second region corresponding to the second area B is a region between a broken line 31 and a broken line 32. That is, an area behind and on the left side of the vehicle 1 appears in the second region of the captured image 30. A line 35 between the broken line 31 and the broken line 32 is a road edge line.

Then, the control process proceeds from step 140 to step 145, where the ECU 6 performs image recognition processing on only the second region of each of multiple frames of the captured image 30 to detect an object approaching the vehicle 1. The same detection method (e.g., motion detection processing) as used at step 130 can be used at step 145.

Then, the control process proceeds from step 145 to step 150, where the ECU 6 performs a predetermined control action depending on the result of the image recognition processing performed at step 145. For example, if an object approaching the vehicle 1 is detected at step 145, the ECU 6 can cause an audio output device (not shown), such as a speaker, to output an audible alarm at step 150 that warns an occupant of the vehicle 1 that there is an object approaching the vehicle 1. Further, at step 150, the ECU 6 can display the captured image 30 on the display apparatus 2. In this case, the approaching object can be highlighted in the captured image 30. Furthermore, at step 150, the ECU 6 can intervene and control the electric sliding door 4 to prevent the electric sliding door 4 from being opened.

In countries, such as Japan, where vehicles keep to the left side of a road, when the vehicle 1 is stopped, an occupant in a rear seat of the vehicle 1 is likely to get off the vehicle 1 on the left side of the vehicle 1. In this case, there is a relatively high risk that the occupant collides with an object approaching the vehicle 1 from behind and the left side of the vehicle 1. According to the first embodiment, the second area B can cover the area behind and on the left side of the vehicle 1. Therefore, an object approaching the vehicle 1 from behind and the left side of the vehicle 1 can be surely detected by performing the image recognition processing on only the second region of the captured image 30 corresponding to the second area B.

In contrast, if an object approaching the vehicle 1 is not detected at step 145, the ECU 6 displays the captured image 30 on the display apparatus 2 at step 150 without performing any other of the above control actions. After step 150, the control process returns to step 110.

At step 155, which is performed when the left blinker is ON, i.e., blinking, the ECU 6 selects the second region of the image captured by the on-board camera 5 as an object detection region. As mentioned above, the second region corresponds to the second area B of the capture area 5a.

Then, the control process proceeds from step 155 to step 160, where the ECU 6 performs image recognition processing on only the second region of each of multiple frames of the captured image 30 to detect an object approaching the vehicle 1. The same detection method (e.g., motion detection processing) as used at step 130 can be used at step 160.

Then, the control process proceeds from step 160 to step 165, where the ECU 6 performs a predetermined control action depending on the result of the image recognition processing performed at step 160. For example, if an object approaching the vehicle 1 is detected at step 160, the ECU 6 can cause an audio output device (not shown), such as a speaker, to output an audible alarm at step 165 that warns an occupant of the vehicle 1 that there is an object approaching the vehicle 1. Further, at step 165, the ECU 6 can display the captured image 30 on the display apparatus 2. In this case, the approaching object can be highlighted in the captured image 30.

When the left blinker of the vehicle 1 is blinking, there is a relatively high risk that the vehicle 1 collides with an object approaching the vehicle 1 from behind the vehicle 1 and the left side of the vehicle 1. According to the first embodiment, the second area B can cover the area behind and on the left side of the vehicle 1. Therefore, an object approaching the vehicle 1 from behind and the left side of the vehicle 1 can be surely detected by performing the image recognition processing on only the second region of the captured image 30 corresponding to the second area B.

In contrast, if an object approaching the vehicle 1 is not detected at step 160, the ECU 6 displays the captured image 30 on the display apparatus 2 at step 165 without performing any other of the above control actions. After step 165, the control process returns to step 110.

At step 170, which is performed when the right blinker is ON, i.e., blinking, the ECU 6 selects a third region of the image captured by the on-board camera 5 as an object detection region. The third region corresponds to a third area C of the capture area 5a.

As shown in FIG. 3, the third area C is a band-like area having a predetermined width in the lateral direction of the vehicle 1. The third area C extends backward from the back end of the vehicle 1 to infinity in the longitudinal direction of the vehicle 1. In the captured image 30 shown in FIG. 5, the third region corresponding to the third area C is a region between a broken line 33 and a broken line 34. That is, an area behind and on the right side of the vehicle 1 appears in the third region of the captured image 30. A line 36 between the broken line 33 and the broken line 34 is a road lane line such as a center line.

Then, the control process proceeds from step 170 to step 175, where the ECU 6 performs image recognition processing on only the third region of each of multiple frames of the captured image 30 to detect an object approaching the vehicle 1. The same detection method (e.g., motion detection processing) as used at step 130 can be used at step 175.

Then, the control process proceeds from step 175 to step 180, where the ECU 6 performs a predetermined control action depending on the result of the image recognition processing performed at step 175. For example, if an object approaching the vehicle 1 is detected at step 175, the ECU 6 can cause an audio output device (not shown), such as a speaker, to output an audible alarm at step 180 that warns an occupant of the vehicle 1 that there is an object approaching the vehicle 1. Further, at step 180, the ECU 6 can display the captured image 30 on the display apparatus 2. In this case, the approaching object can be highlighted in the captured image 30.

In contrast, if an object approaching the vehicle 1 is not detected at step 175, the ECU 6 displays the captured image 30 on the display apparatus 2 at step 180 without performing any other of the above control actions. After step 180, the control process returns to step 110.

As described above, according to the first embodiment, the ECU 6 of the vehicle 1 selects a predetermined region of the image captured by the on-board camera 5 as an object detection region according to information contained in the vehicle signal received through the vehicle signal receiver 3. Then, the ECU 6 tries detecting an object approaching the vehicle 1 by performing image recognition processing on only the object detection region of the captured image.

Since the image recognition processing is performed on only a limited region of the captured image, processing load required to detect an object approaching the vehicle 1 can be reduced as compared to when the image recognition processing is performed on the entire region of the captured image. Further, the object detection region is selected according to an operating condition of the vehicle 1. In such an approach, although the image recognition processing is performed on only the object detection region, an object dangerous to the vehicle 1 can be suitably detected.

Second Embodiment

A second embodiment of the present disclosure is described below with reference to FIGS. 6 and 7. A difference of the second embodiment from the first embodiment is that the ECU 6 performs a control process shown in FIG. 6 instead of the control process shown in FIG. 2.

Figure 6:
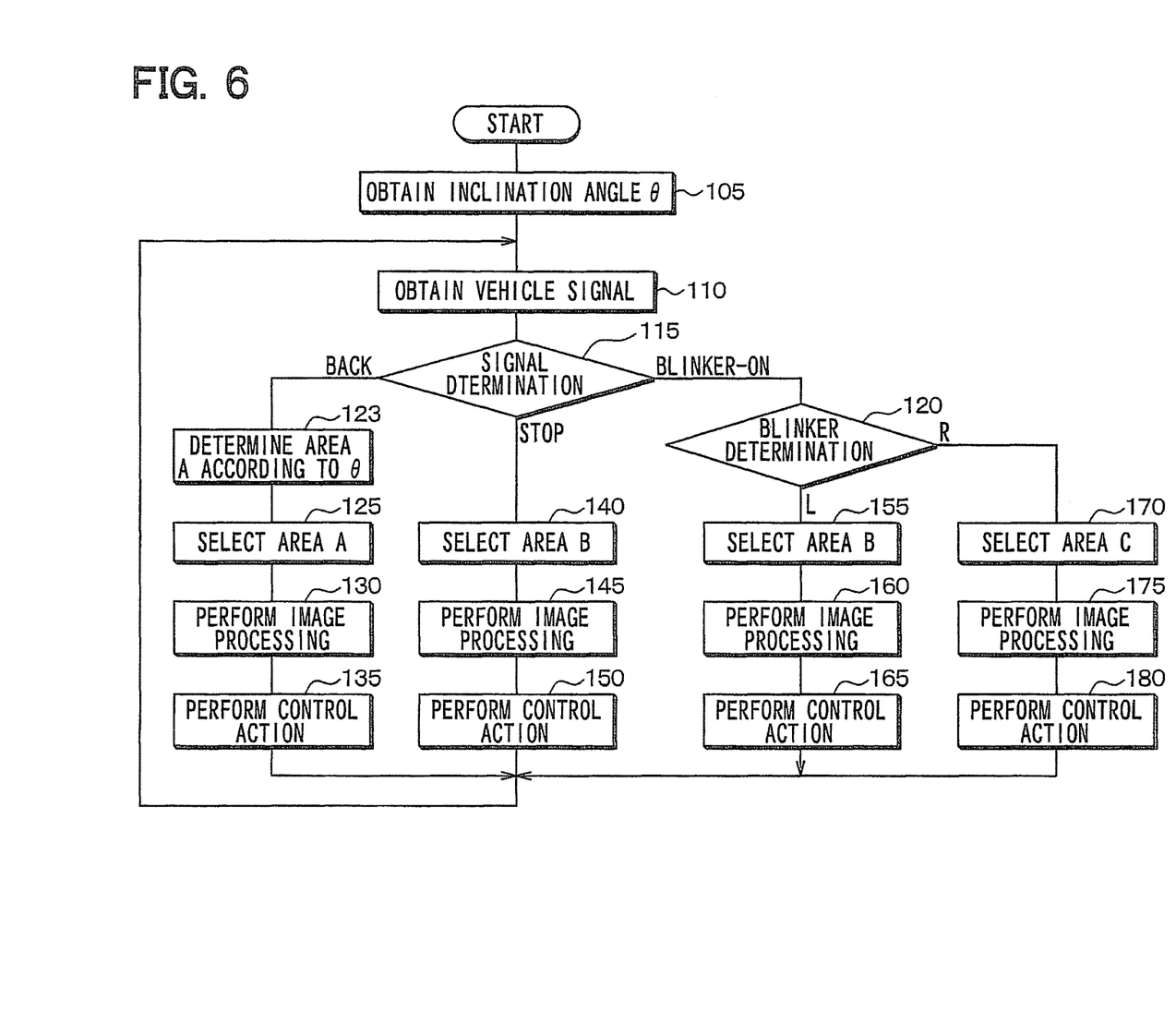
FIG. 6 is a flow diagram illustrating a control process performed by an electronic control unit of a vehicle system according to a second embodiment of the present disclosure.

As can be seen by comparing FIGS. 2 and 6, additional steps 105 and 123 are included in the second embodiment. Step 105 is performed before step 110, and step 123 is performed before step 125. At step 105, the ECU 6 detects an inclination angle θ of a road around (e.g., behind) the vehicle 1 with respect to the lateral direction of the vehicle 1. At step 123, the ECU 6 determines the first area A according to the detected inclination angle θ.

A method of detecting the inclination angle θ at step 105 is described in detail below. In an example shown in FIG. 7, a longitudinal direction 48 of the road is inclined at an angle θ with respect to a lateral direction 47 of a parking lot sectioned by lines 51-54. When the vehicle 1 is stopped and parked in the parking lot, the road behind the vehicle 1 is inclined at the angle θ with respect to the lateral direction of the vehicle 1.

In this case, at step 105, the ECU 6 determines the direction of the road based on the image captured by the on-board camera 5. For example, the ECU 6 can detect a direction, in which white lines (or border lines, ruts) 41-46 on the road extend, by performing conventional image processing, including distortion correction, binarization, and Hough transform, on the captured image. The ECU 6 determines the detected direction of the white lines 41-46 as the direction of the road. Then, the ECU 6 calculates an angle θ of the determined direction of the road with respect to the lateral direction of the vehicle 1. The calculated angle θ is the inclination angle θ.

Next, step 123 is described in detail. When the vehicle signal is the shift position signal indicating that the shift position of the vehicle 1 is in the reverse position corresponding to "REVERSE" at step 115, the control process proceeds to step 123. At step 123, the ECU 6 determines the first area A according to the inclination angle .theta. calculated at step 105.

Figure 7:
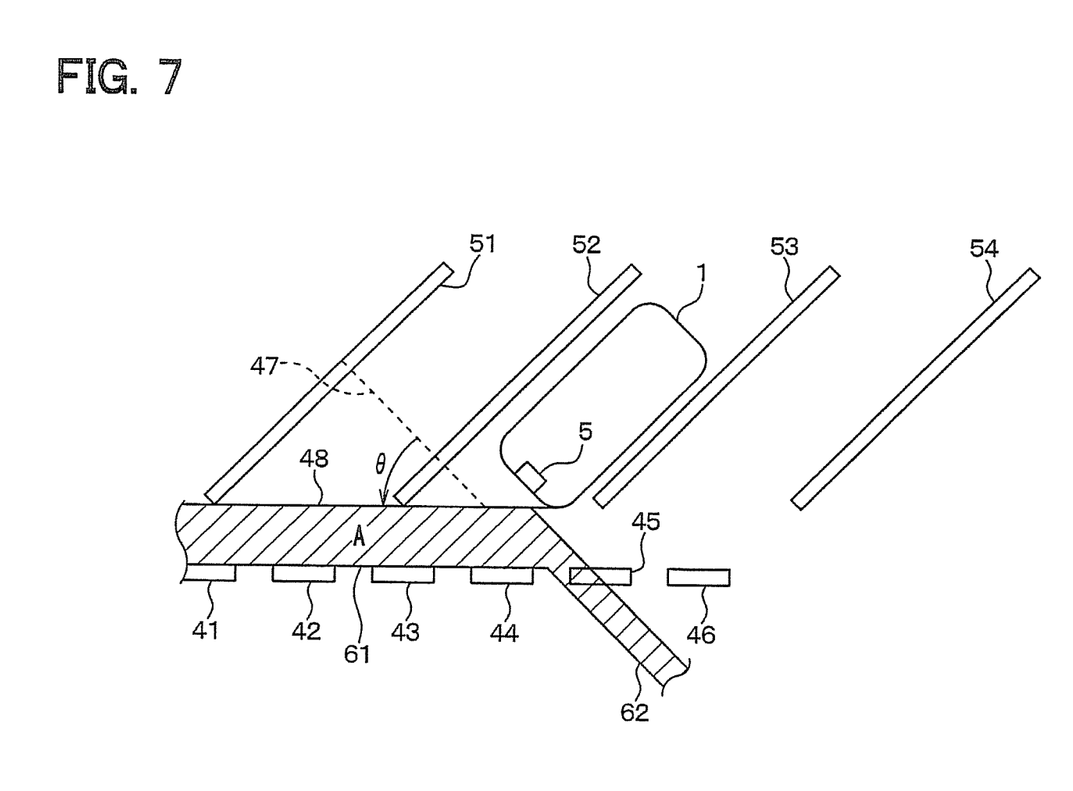
FIG. 7 is a diagram illustrating an inclination angle of a road with respect to the vehicle.

Specifically, as shown in FIG. 7, the first area A is the sum of an area 61 and an area 62. The area 61 is a band-like area having a predetermined width. The area 61 extends parallel to the direction of the road from infinity to an end of the capture area of the on-board camera 5. The area 62 extends from an end of the area 61 to infinity in the lateral direction of the vehicle 1 on the right side of the vehicle 1 along the end of the capture area of the on-board camera 5.

Then, at step 125, the ECU 6 selects the first region of the captured image, corresponding to the first area A determined at step 123, as an object detection region. Then, at step 130, the ECU 6 performs image recognition processing on only the first region to detect an object approaching the vehicle 1. Then, at step 135, the ECU 6 performs a predetermined control action depending on the result of the image recognition processing performed at step 130, as mentioned in the first embodiment.

As described above, according to the second embodiment, the ECU 6 of the vehicle 1 detects the inclination angle .theta. of the road around the vehicle 1 with respect to the vehicle 1. Then, the ECU 6 determines the first area A according to the detected inclination angle .theta. so that the first area A can cover an area extending along the road. In such an approach, although the image recognition processing is performed on only the object detection region, an object dangerous to the vehicle 1 can be suitably detected.

The correspondence between the terms used in the embodiments and claims is as follows. The ECU 6 can serve as a signal receiver in claims by performing step 110. The ECU 6 can serve as a selector in claims by performing steps 115, 120, 123, 125, 140, 155, and 170. The ECU 6 can serve as a calculator in claims by performing step 105.

Modifications

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

In the embodiments, the on-board camera 5 is configured to capture an image of the area behind the vehicle 1. Alternatively, the on-board camera 5 can be configured to capture an image of the area ahead of or all around the vehicle 1. Even in such a case, the same advantages as the embodiments can be obtained by selecting a predetermined region of the image captured by the on-board camera 5 as an object detection region according to information contained in the vehicle signal received through the vehicle signal receiver 3 and by detecting an object approaching the vehicle 1 by performing image recognition processing on only the object detection region of the captured image.

In the embodiments, the electric sliding door 4 is a left backseat door of the vehicle 1. Alternatively, the electric sliding door 4 can be a right backseat door of the vehicle 1. That is, in countries, such as the United States, where vehicles keep to the right side of a road, when the vehicle 1 is stopped, an occupant in a rear seat of the vehicle 1 is likely to get off the vehicle 1 on the right side of the vehicle 1. In such countries, there is a relatively high risk that the occupant collides with an object approaching the vehicle 1 from behind and the right side of the vehicle 1. Therefore, at step 140 in FIGS. 2 and 6, the ECU 6 selects the third region of the captured image corresponding to the third area C of the capture area 5a. In this case, in FIG. 5, the line 31 can represent the road lane line, and the line 36 can represent the road edge line.

What is claimed is:

1. An apparatus for detecting an object approaching a vehicle by performing image recognition processing on an image captured by a camera that is mounted on the vehicle to cover a predetermined area around the vehicle, the apparatus comprising:

a signal receiver configured to obtain a vehicle signal indicative of an operating condition of the vehicle;

a selector configured to select a predetermined region of the captured image, according to the vehicle signal, as an object detection region;

a detector configured to detect the object approaching the vehicle by performing the image recognition processing on only the object detection region of the captured image; and a calculator configured to calculate an inclination angle of a road around the vehicle with respect to the vehicle, wherein the calculator calculates the inclination angle based on the captured image, and the selector selects the object detection region based on the inclination angle in such a manner that the object detection region corresponds to an area extending along the road.

2. The apparatus according to claim 1, wherein
the vehicle signal includes a shift position signal indicating that the vehicle moves back,
when the signal receiver obtains the shift position signal, the selector selects the object detection region in such a manner that the object detection region has neither a predetermined lower region of the captured image nor a predetermined upper region of the captured image, and
the predetermined lower region and the predetermined upper region correspond to an area behind the vehicle, the predetermined lower region is closer to a back end of the vehicle than the predetermined upper region.

3. The apparatus according to claim 1, wherein
the vehicle signal includes a shift position signal indicating that the vehicle is stopped, and
when the signal receiver obtains the shift position signal, the selector selects the object detection region in such a manner that the object detection region corresponds to an area behind and on the left side of the vehicle.

4. The apparatus according to claim 1, wherein
the vehicle signal includes a shift position signal indicating that the vehicle is stopped, and
when the signal receiver obtains the shift position signal, the selector selects the object detection region in such a manner that the object detection region corresponds to an area behind and on the right side of the vehicle.

5. The apparatus according to claim 1, wherein
the vehicle signal includes a shift position signal indicating that a left or right blinker of the vehicle is blinking,
when the signal receiver obtains the shift position signal, the selector selects the object detection region in such a manner that the object detection region corresponds to an area behind and on a predetermined side of the vehicle, and
the predetermined side is indicated by the blinking blinker.

6. An apparatus for detecting an object approaching a vehicle by performing image recognition processing on an image captured by a camera that is mounted on the vehicle to cover a predetermined area around the vehicle, the apparatus comprising:

a calculator configured to calculate an inclination angle of a road around the vehicle with respect to the vehicle, wherein the calculator calculates the inclination angle based on the captured image;

a selector configured to select a predetermined region of the captured image, according to the inclination angle, as an object detection region; and a detector configured to detect the object approaching the vehicle by performing the image recognition processing on only the object detection region of the captured image, wherein the object detection region corresponds to an area extending along the inclination angle of the road.

* * * * *